(Model.)
F. X. OBERLE.
KITCHEN SAFE.
No. 274,021. Patented Mar. 13, 1883.
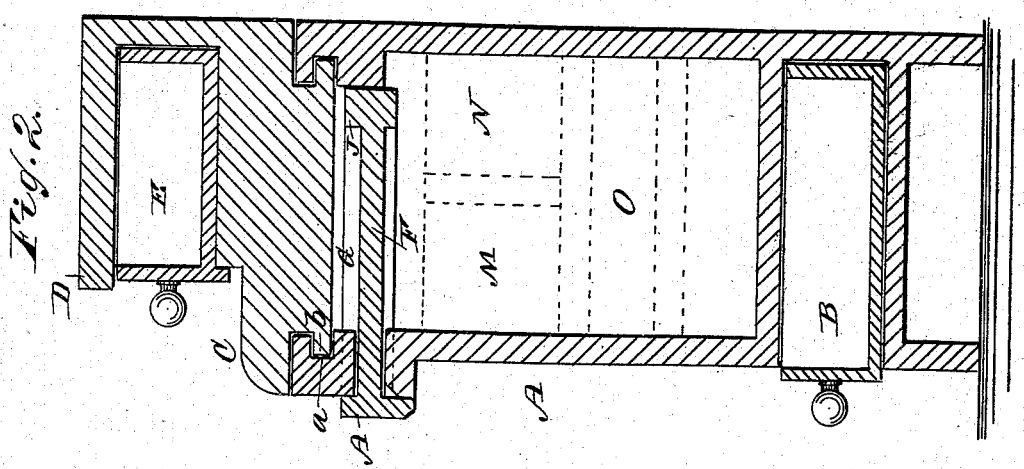
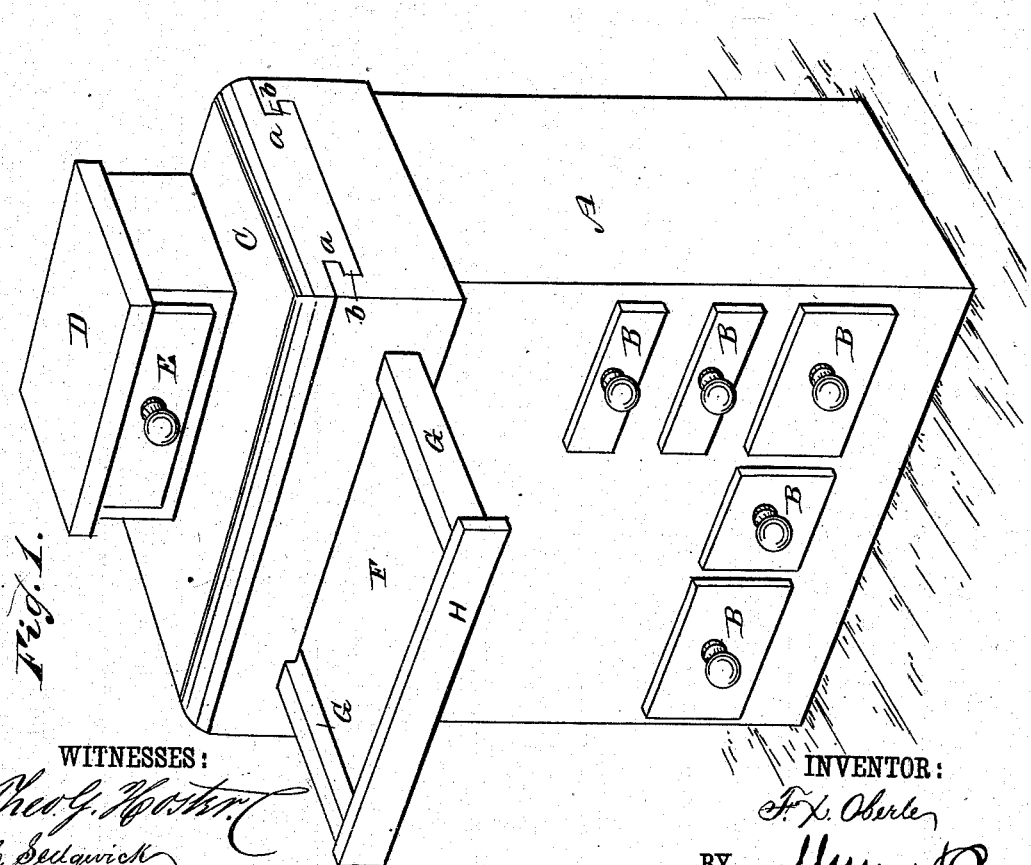
WITNESSES:
INVENTOR:
F. X. Oberle
BY 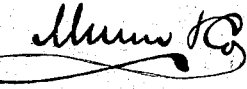
ATTORNEYS.

UNITED STATES PATENT OFFICE.

FRANKLIN X. OBERLE, OF ST. JOSEPH, MISSOURI.

KITCHEN-SAFE.

SPECIFICATION forming part of Letters Patent No. 274,021, dated March 13, 1883.

Application filed January 9, 1883. (Model.)

*To all whom it may concern:*

Be it known that I, FRANKLIN X. OBERLE, of St. Joseph, in the county of Buchanan and State of Missouri, have invented a new and Improved Kitchen-Safe, of which the following is a full, clear, and exact description.

The object of my invention is to provide a new and improved kitchen-safe which is furnished with compartments for containing flour and with a board for making dough.

The invention consists in a kitchen-safe constructed with a sliding top, and with a sliding kneading or baking board which covers a series of compartments formed in the safe, whereby, if the top is moved to one side and the baking or kneading board is withdrawn, the flour which is contained in the above-mentioned compartments can be scooped from the same and formed into loaves, cakes, &c., on the board.

The invention also consists in combinations of parts, as will be fully described and set forth hereinafter.

Reference is to be had to the accompanying drawings, forming a part of this specification, in which similar letters of reference indicate corresponding parts in both the figures.

Figure 1 is a perspective view of my improved kitchen-safe, showing the kneading-board withdrawn. Fig. 2 is a cross-sectional elevation of the same, showing the kneading or baking board pushed into the safe.

The box or safe A is provided with a series of drawers, B, of suitable size, which are adapted to receive salt, sugar, and other like articles used in the kitchen, which drawers can be withdrawn from the front of the safe. The top C of the safe is provided in its longitudinal edges with grooves a, into which tongues b, formed on the top of the safe, project, thus permitting the top C to slide in the direction of its length. A box, D, provided with a drawer, E, for containing some suitable article, is secured on the top C. A kneading or baking board, F, is held in the upper part of the safe A, below the top C, and is adapted to slide in and out. The kneading-board is provided with side pieces, G, which guide it, and with a front end piece, H, the said side and end pieces, G and H, projecting above the surface of the board. At its inner end it is provided with a rear end piece, J, which strikes against the front of the safe when the board F is withdrawn, and thus prevents the board F from being withdrawn entirely from the safe. The space below the kneading-board is divided into a series of compartments, M, N, and O, for receiving different grades of flour, which compartments are open at the top.

If dough is to be made, the top C is removed by sliding it off of the safe in the direction of its length, and then the kneading-board F is withdrawn, thereby opening the tops of the compartments M, N, and O, which contain the flour. By means of a scoop the desired flour can easily be taken from the compartment and put upon the board F, and can be kneaded, molded, &c., to form loaves of the desired form or shape.

If desired, the kneading-board can be made of a stone slab, such as confectioners use. When not in use the board is pushed into the safe and the top C is replaced. It is not necessary that the top C should be entirely removed from the safe, but need only be moved in the direction of its length sufficiently to uncover the top of the safe.

The above-described safe occupies but very little space, can contain a large quantity of different kinds of materials, and is very handy and convenient for making bread, biscuits, pastry, &c.

Having thus fully described my invention, I claim as new and desire to secure by Letters Patent—

1. The combination, with a kitchen-safe, of a sliding kneading-board, F, and a sliding top, C, substantially as herein shown and described, and for the purpose set forth.

2. The combination, with a kitchen-safe, A, divided into compartments open at the top, of the sliding kneading or baking board F and the sliding top C, substantially as herein shown and described, and for the purpose set forth.

FRANKLIN X. OBERLE.

Witnesses:
J. L. UNANGST,
JOHN MUEHLEISEN.